United States Patent [19]

Miller

[11] Patent Number: 4,472,673
[45] Date of Patent: Sep. 18, 1984

[54] ROTATING ELECTRIC MACHINE WITH SPEED/FREQUENCY CONTROL

[75] Inventor: Jeorge Miller, Bogota, Colombia

[73] Assignee: Energia Andina Ltda., Bogota, Colombia

[21] Appl. No.: 368,684

[22] Filed: Apr. 15, 1982

[51] Int. Cl.³ .................. H02K 16/00; H02P 9/14; H02P 9/42
[52] U.S. Cl. ............................ 322/32; 310/114; 322/47; 322/61; 322/62
[58] Field of Search .............. 322/28, 32, 63–66, 322/61, 47, 29

[56] References Cited

U.S. PATENT DOCUMENTS 3,183,431  5/1965  Ford ........................ 322/32
3,476,998  11/1969  Agarwal .................. 322/32 X
3,571,693  3/1971  Riaz ........................ 322/32
4,246,531  1/1981  Jordan .................... 322/32 X Primary Examiner—R. J. Hickey
Attorney, Agent, or Firm—Scully, Scott, Murphy & Presser

[57] ABSTRACT

A rotating electric machine comprising a stator 1 and a rotor 5 which is adapted to be rotated about an axis and which is disposed opposite said stator 1. Normally, the magnetic field of the rotor is excited by a direct current which is supplied via sliding contacts. In order to avoid wear of the sliding contacts, the invention employs the measure that the exciting current for the magnetic field of the rotor is supplied via a second stator 13 and a second rotor 9 by means of induction.

4 Claims, 3 Drawing Figures

ROTATING ELECTRIC MACHINE WITH SPEED/FREQUENCY CONTROL

DESCRIPTION

The present invention relates to a rotating electric machine in which a rotating electric machine comprises a first stator and a first rotor disposed opposite the first stator, and further in which a number N of stator windings are uniformly disposed around the first stator.

A rotating electric machine of the type mentioned hereinbefore is known from its use as a synchronous rotary current generator. In the case of such a synchronous rotary current generator the stator has provided thereon three stator windings disposed on a circle round the axis and offset by 120° with respect to one another. The rotor, which is adapted to be rotated about the axis and which is disposed opposite the stator, has provided thereon a direct-current winding. The direct current flowing through said rotor winding generates a constant magnetic field rotating with the rotor. Due to the time-dependent change in the magnetic flux flowing through the stator windings a voltage is induced in the stator windings. When a connection to a rotary current load or to a rotary current mains supply is established, a rotary current flows through the stator windings so that the load or the mains supply is supplied with active power. In view of the fact that the rotor rotates, the exciting current must be supplied to the rotor winding via sliding contacts. Such a rotating electric machine has a disadvantage that, due to the high electrical and mechanical loads occurring, the sliding contacts will be worn-out after a short period of time so that said sliding contacts are constantly in need of maintenance.

The present invention is based on the task of providing a rotating electric machine of the type mentioned hereinbefore, which can be operated without any use of sliding contacts and which, consequently, avoids the above-mentioned disadvantages of the known structural design.

This task is solved by a rotating electric machine of the abovementioned type in which the first rotor is also provided with a number N of rotor windings disposed uniformly therearound. A second rotor is also provided which rotates with the first rotor and is arranged opposite a second stator. Each of the second rotor and the second stator is also provided with a number N of electrical windings arranged uniformly therearound. Pursuant to the techings of the present invention, when the rotor windings of each of the first and second rotors are referred to by a series of reference numbers $n = 1, 2, \ldots N$, the first rotor winding of the first rotor is connected to the first rotor winding of the second rotor, and regarding the other rotor windings, the $n^{th}$ rotor winding of the first rotor is connected to the $[N=2-n]^{th}$ rotor winding of the second rotor so that the rotary fields at the two rotors have opposite directions of rotation.

Among other advantages, the rotating electric machine according to the invention shows the following advantages:

The machine can be excited by supplying rotary current to the windings of the second stator.

The machine can also be excited by supplying direct current to one of the windings of the second stator.

When used as a generator, the machine can have it output frequency influenced, since said output frequency consists of the negative rotational frequency of the rotary field applied to the second stator and of twice the rotational frequency of the rotor.

When the machine is used as a motor, the speed of rotation of the rotors can be adjusted due to the face that it is half the sum of the speeds of rotation of the rotational speed of the rotary field applied to the first stator and of the rotary field applied to the second stator.

The construction of this machine does not require any special components so that the machine can be produced by employing the production means of any factory constructing electric machines.

An advantageous development of the rotating electric machine according to the invention for use as a generator in which a measuring circuit is provided for determining the speed of rotation of the rotors. A control circuit is provided for controlling an exciting current generator, and when the speed of rotation and the rotary phase of the rotors deviate from their nominal speed of rotation and nominal phase, it readjusts the speed of rotation and the rotary phase of an input rotary field, which is generated by an exciting rotary current flowing in the stator windings of the second stator, such that the frequency and phase position of the rotary voltage induced in the windings of the first stator maintain predetermined nominal values. Adapting the frequency and the phase position of the rotary voltage induced in the windings of the first stator to predetermined nominal values is one of the fundamental problems in the field of generator technology. Such an adaptation is particularly necessary in cases in which a generator has to supply power to a mains which is already supplied with power by other generators. Normally, complicated mechanical control means are provided for controlling these quantities, said control means influencing the speed and the phase position of the rotor. In the case of the rotating electric machine according to the invention for use as a generator, as taught herein, this problem is solved in a simple manner by the feature that the frequency and the phase position of the rotary current, which is supplied to the windings of the second stator, are controlled in such a way that, in spite of changes in the speed of rotation of the rotors, a constant phase and frequency of the rotary voltage induced in the windings of the first stator is maintained.

A further development of the rotating electric machine according to the invention for use as a generator is disclosed in in which a second measuring circuit is provided for measuring the voltage amplitude of the rotary voltage induced in the windings of the first stator, and a second control circuit is provided for controlling the amplitude of the exciting rotary current, which flows through the stator windings of the second stator such that the amplitude of the rotary voltage induced in the windings of the first stator remains constant in a load-independent manner within the power range of the generator.

A further advantageous development of the rotating electric machine according to the invention for use as a motor is disclosed in which a circuit is provided for regulating or controlling the speed of rotation of the exciting rotary current flowing in the second stator, which is designed such that the speed of rotation of the rotors can be continuously adjusted by adjusting the sum of the speeds of rotation of the rotary magnetic field generated by the exciting rotary current in the windings of the first rotor and of the rotary magnetic field generated by the rotary current flowing in the windings of the first stator. Normally, in the case of synchronous motors the difficulty occurs that a starting motor is required for starting these machines, since latching or synchronizing of the motor speed is only possible when the motor rotates at approximately the same rotational speed as the rotary magnetic field generated by the rotary current flowing in the windings of the first stator. The structural design of a motor as discussed above eliminates the necessity of providing a starting motor as well as the problem of synchronous latching of the motor. In view of the fact that the rotational speed results from half the sum of the rotational speeds of the rotary fields generated by the currents in the windings of the stators, the starting operation can e.g. simply be effected by employing the measure that, at first, the field at the second stator rotates at the same, but oppositely directed rotational speed as the field at the first stator. In response to a slow change in the rotational speed of the field at the second stator, the rotors start to rotate. This, too, is a possible way of adjusting any desired speed of rotation of the rotors, in spite of the synchronous mode of operation.

One embodiment of the rotating electric machine according to the invention will be described hereinafter on the basis of the drawing, in which.

Figure 1:
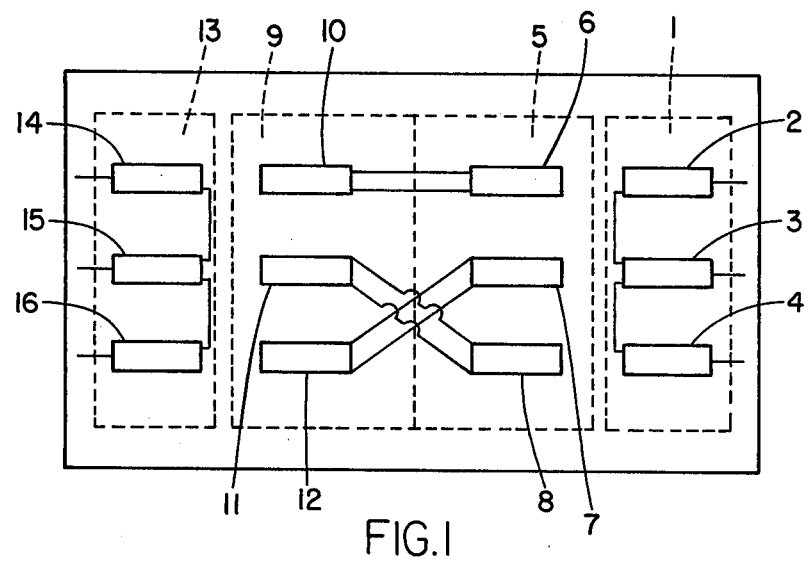
FIG. 1 is a schematic representation of the winding arrangement.

The special case (N=3) shown in the figures will be the most common form of application, since this is the conventional three-phase rotary current system. A first stator 1 has provided thereon three stator windings 2, 3, 4 disposed on a circle round an axis and offset by 120° with respect to one another. A rotor 5, which is rotated about the axis, is disposed opposite the stator. Said rotor has provided thereon three rotor windings 6, 7, 8 which are disposed on a circle round the axis thereof and offset by 120° with respect to one another and which are used for exciting a magnetic field. A second rotor 9 is fixedly connected to said first rotor 5 and rotates at the speed of rotation of said first rotor 5 about the axis thereof. The connection between the two rotors 5, 9 can be effected by an axis by means of which the rotors 5, 9 are supported. The second rotor 9 has provided thereon three rotor windings 10, 11, 12 disposed on a circle round the axis and offset by 120° with respect to one another. The first rotor winding 6 of the first rotor 5 is connected to the first rotor winding 10 of the second rotor 9. The second rotor winding 7 of the first rotor 5 is connected to the third rotor winding 12 of the second rotor 9. The third rotor winding 8 of the first rotor 5 is connected to the second rotor winding 11 of the second rotor 9. A second stator 13 is disposed opposite the second rotor 9. Said second stator 13 has provided thereon three stator windings 14, 15, 16 disposed on a circle round the axis and offset by 120° with respect to one another.

Figure 2:
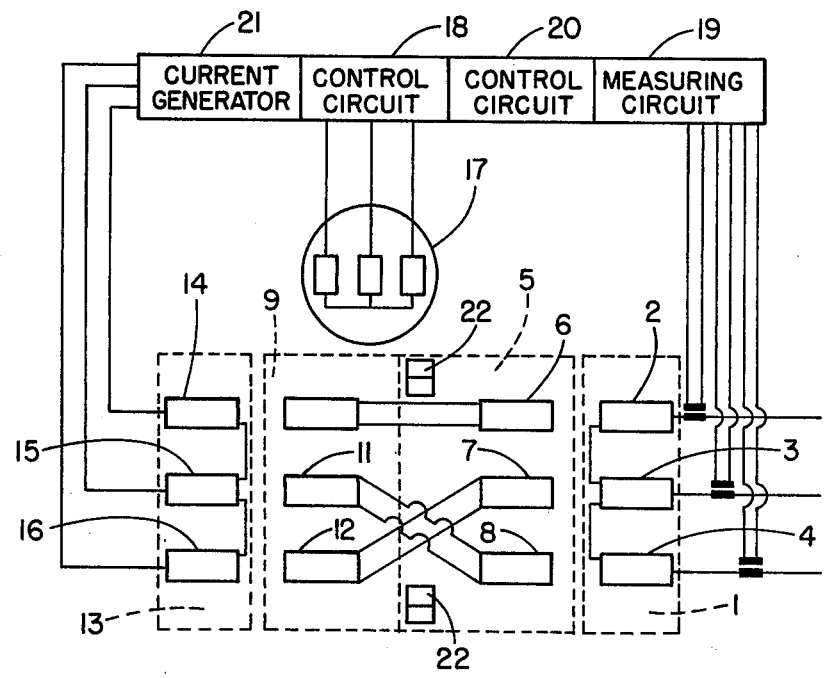
FIG. 2 is a schematic representation of a speed- and amplitude-controlled rotary current generator provided with the winding arrangement shown in FIG. 1.

FIG. 2 shows the above described rotating electric machine when used as a generator. The speed of rotation of the rotors 5, 9 is determined by a measuring means. The measuring means consists of a circulating permanent magnet 22 and of a stationary induction coil. A control means 18 controls the frequency and phase of an exciting current generator 21. It is thus achieved that, when the speed of rotation and the rotary phase of the rotors 5, 9 deviate from their nominal speed of rotation and nominal phase, the speed of rotation and the rotary phase of an input rotary field, which is generated by an exciting rotary current flowing in the stator winding 14, 15, 16 of the second stator 13, is readjusted such that the frequency and phase position of the rotary voltage induced in the windings 2, 3, 4 of the first stator 1 maintains predetermined nominal values. In the case of low power levels the exciting current generator may be designed as a solid-state circuit. In the case of higher power levels the exciting current generator could consist of an additional generator, as shown in FIG. 2, which precedes this generator, said preceding generator being in turn fed by a solid-state exciting current generator. A second measuring means 19 taps via an inductive coupling the voltage amplitude of the rotary voltage induced in the windings 2, 3, 4 of the first stator 1. A second control means 20 controls the amplitude of the exciting current, which flows through the stator windings 14, 15, 16 of the second stator 13, such that the amplitude of the rotary voltage induced in the windings 2, 3, 4 of the first stator 1 remains constant in a load-independent manner within the power range of the generator. In the case of an increase in the load, i.e. when the amplitude of the rotary voltage applied to the windings 2, 3, 4 of the first stator 1 decreases, the measuring means 19 will measure the voltage drop and impart this information to the control means 20 which, in turn, will increase the amplitude of the exciting rotary current supplied to the windings 14, 15, 16 of the stator 13. It is a matter of course that not even such a controlled system will be capable of increasing the power range of a generator, but the only thing which can be achieved is a constant output voltage of the generator even in the case of varying loads, as long as the maximum load on the generator is not exceeded. The control means 20 for controlling the amplitude can also be designed as a solid-state circuit, as long as the exciting current required has only small or medium values. In view of the fact that in the case of high power requirements a cascade connection of the generators is necessary not least for purposes of frequency control, it will also in this case be possible to design the respective first exciting generator as a solid-state circuit.

The invention is not limited to the three-phase rotary current system. The rotating electric machine according to the invention can be used in N-phase rotary current systems in an equally advantageous manner. And it is also possible to supply only a single winding 14, 15, 16 of the second stator 13 with a direct current serving to excite the rotary current generator or the rotary current motor. In this case the other two windings of the second stator 13 will be superfluous. It is also possible to use the windings 14, 15, 16 simultaneously as a measuring means 17 for measuring the speed of rotation of the rotors 5, 9. When the rotor is driven by a synchronous motor, the electric machine according to the invention can also be used for transmitting power from a first rotary current mains supply having a first frequency to a second rotary current mains supply having a second frequency.

Figure 3:
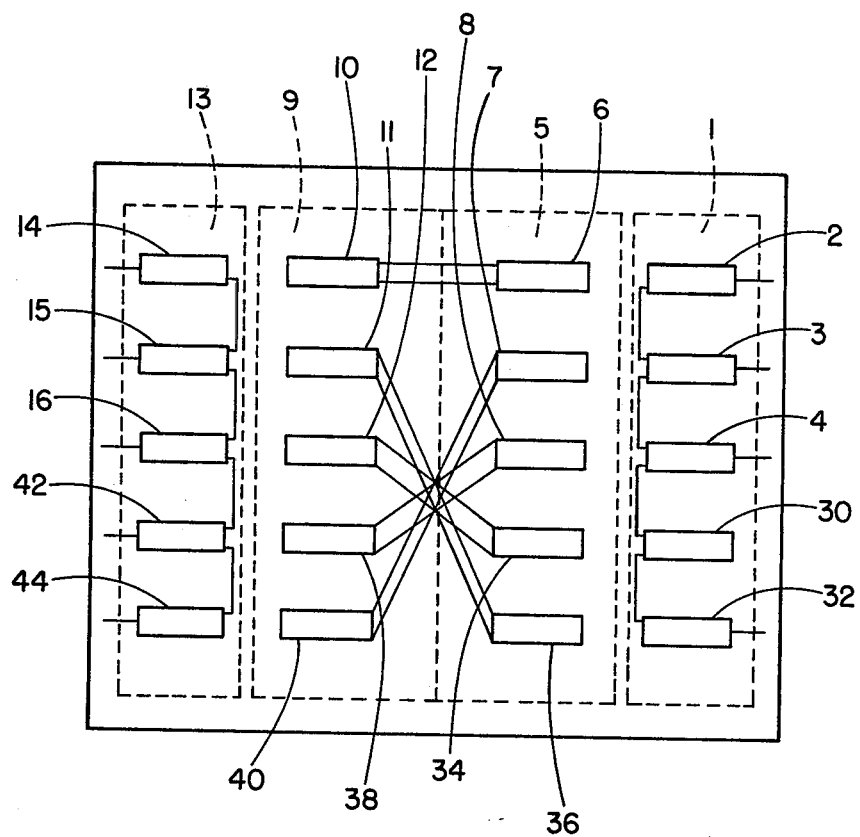
FIG. 3 illustrates a schematic representation of a winding arrangement similar to that of FIG. 1, but for the special case where N=5.

FIG. 3 illustrates a winding arrangement pursuant to the present invention for the special case wherein N=5. Similar to the embodiment of FIG. 1, a first stator 1 has provided thereon five stator windings 2, 3, 4, 30, 32, disposed on a circle round an axis and offset by 72° with respect to one another. A rotor 5, which is adapted to be rotated about the axis, is disposed opposite the stator. The rotor has provided thereon five rotor windings 6, 7, 8, 34, 36 which are disposed on a circle round the axis thereof and offset by 72° with respect to one another and which are used for exciting a magnetic field. A second rotor 9 is fixedly connected to the first rotor 5 and rotates at the speed of rotation of said first rotor 5 about the axis thereof. The second rotor 9 has provided thereon five rotor windings 10, 11, 12, 38, 40 disposed on a circle round the axis and offset by 72° with respect to one another. The rotor connections illustrated in FIG. 3 are all in accordance with the specified formula for the special case wherein N=5. The first rotor winding 6 of the first rotor 5 is connected to the first rotor winding 10 of the second rotor 9. The second rotor winding 7 of the first rotor 5 is connected to the fifth rotor winding 40 of the second rotor 9. The third rotor winding 8 of the first rotor 5 is connected to the fourth rotor winding 38 of the second rotor 9. The fourth rotor winding 34 of the first rotor 5 is connected to the third rotor winding 12 of the second rotor 9. The fifth rotor winding 36 of the first rotor 5 is connected to the second rotor winding 11 of the second rotor 9. A second stator 13 is disposed opposite the second rotor 9. The second stator 13 has provided thereon five stator windings 14, 15, 16, 40, 42, disposed on a circle round the axis and offset by 72° with respect to one another.

I claim:

1. A rotatable electric machine comprising a stator (1) and a rotor (5) disposed opposite said stator (1) and rotatable about an axis, and further comprising a number N of stator windings (2, 3, 4) disposed on said stator (1) on a circle round the axis at uniform distances from one another, characterized in that the rotor (5) has provided thereon a number N of rotor windings (6, 7, 8) disposed on a circle round the axis at uniform distances from one another and used for exciting a magnetic field, said number N of rotor windings corresponding to said number N of stator windings, and said number N being greater than three, that a second rotor (9) is connected to said first rotor (5) and rotates at the speed of rotation of said first rotor (5) about the axis thereof, that said second rotor (9) has provided thereon a number N of rotor windings (10, 11, 12) disposed on a circle round the axis at uniform distances from one another, said number N of rotor windings corresponding to said number N of stator windings, that, when the rotor windings of each rotor are referred to by a series of reference numbers $n = 1, 2, \ldots N$, wherein N is greater than three, the first rotor winding (6) of the first rotor (5) is connected to the first rotor winding (10) of the second rotor (9) and that, as far as the other rotor windings (7, 8) are concerned, the $n^{th}$ rotor winding (7,8) of the first rotor (5) is connected to the $[N+2-n]^{th}$ rotor winding (12, 9) of the second rotor (9) so that the rotary fields at the two rotors (5, 9) have opposite directions of rotation with regard to said rotors (5, 9), that a second stator (13) is provided for the second rotor (9), and that sid second stator (13) has provided thereon a number N of stator windings (14, 15, 16) disposed on a circle round the axis at uniform distances from one another, said number N of stator windings of said second stator corresponding to said number N of stator windings of said first stator.

2. A rotatable electric machine according to claim 1, for use as a generator, characterized by a measuring means (17) for determining the speed of rotation of the rotors (5, 9)

and a control means (18) for controlling an exciting current generator (21), said control means being used, when the speed of rotation and the rotary phase of the rotors (5, 9) deviate from their nominal speed of rotation and nominal phase, for readjusting the speed of rotation and the rotary phase of an input rotary field, which is generated by an exciting rotary current flowing in said stator winding (14, 15, 16) of said second stator (13), such that the frequency and phase position of the rotary voltage induced in the windings (2, 3, 4) of the first stator (1) maintains predetermined nominal values.

3. A rotatable electric machine according to claim 2, characterized by a second measuring means (19) for measuring the voltage amplitude of the rotary voltage induced in the windings (2, 3, 4) of the first stator (1) and a second control means (20) for controlling the amplitude of the exciting rotary current, which flows through the stator windings (14, 15, 16) of the second stator (13), such that the amplitude of the rotary voltage induced in the windings (2, 3, 4) of the first stator (1) remains constant in a load-independent manner within the power range of the generator.

4. A rotatable electric machine according to claim 1, for use as a motor, characterized by a means for regulating or controlling the speed of rotation of the exciting rotary current flowing in said second stator, said means being designed such that the speed of rotation of the rotors can be continuously adjusted by adjusting the sum of the speeds of rotation of the rotary magnetic field generated by the exciting rotary current in the windings (6, 7, 8) of the first rotor (5) and of the rotary magnetic field generated by the rotary current flowing in the windings (2, 3, 4) of the first stator (1).

* * * * *